United States Patent
Ikeda et al.

(10) Patent No.: US 12,034,334 B2
(45) Date of Patent: Jul. 9, 2024

(54) REDUNDANCY RESOLVER DEVICE AND ELECTRIC POWER STEERING DEVICE

(71) Applicant: Mitsubishi Electric Corporation, Tokyo (JP)

(72) Inventors: Hiroko Ikeda, Tokyo (JP); Tatsuya Mori, Tokyo (JP); Kenta Motoyoshi, Tokyo (JP); Kodai Okazaki, Tokyo (JP); Kenji Ikeda, Tokyo (JP); Yosuke Sugino, Tokyo (JP); Seiji Sawada, Tokyo (JP); Kenta Kubo, Tokyo (JP); Toshihiro Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 377 days.

(21) Appl. No.: 17/442,747

(22) PCT Filed: May 24, 2019

(86) PCT No.: PCT/JP2019/020660
§ 371 (c)(1),
(2) Date: Sep. 24, 2021

(87) PCT Pub. No.: WO2020/240616
PCT Pub. Date: Dec. 3, 2020

(65) Prior Publication Data
US 2022/0224172 A1 Jul. 14, 2022

(51) Int. Cl.
*H02K 1/14* (2006.01)
*H02K 1/16* (2006.01)
(Continued)

(52) U.S. Cl.
CPC ............ *H02K 1/148* (2013.01); *H02K 1/16* (2013.01); *H02K 3/28* (2013.01); *H02K 11/33* (2016.01)

(58) Field of Classification Search
CPC .... G01D 5/2046; G01D 5/2216; H02K 1/148; H02K 11/33; H02K 1/16; H02K 3/28
(Continued)

(56) References Cited

U.S. PATENT DOCUMENTS

| 7,268,537 B2* | 9/2007 | Nakano | G01D 5/2046 310/68 B |
| 8,427,142 B2* | 4/2013 | Nakano | G01D 5/2046 324/207.25 |

(Continued)

FOREIGN PATENT DOCUMENTS

| JP | 2000102222 A * | 4/2000 | ............ H02K 11/00 |
| JP | 2009-222435 A | 10/2009 | |

(Continued)

OTHER PUBLICATIONS

English machine translation Kawamata et al. JP-2000102222 (Year: 2000).*
International Search Report for PCT/JP2019/020660 dated Jun. 18, 2019.
Written Opinion for PCT/JP2019/020660 dated Jun. 18, 2019.
(Continued)

*Primary Examiner* — Burton S Mullins
(74) *Attorney, Agent, or Firm* — Sughrue Mion, PLLC; Richard C. Turner

(57) ABSTRACT

A resolver device with redundancy, wherein winding groups of different systems are arranged at different positions in a circumferential direction of a stator core. The winding groups of each system include: an excitation winding group consisting of a plurality of excitation windings, each of which is connected to a corresponding one of plural excitation circuits; and a first output winding group; and a second output winding group. Each of the stator teeth has a corresponding one of the excitation windings wound therearound. When two of the excitation windings belonging to
(Continued)

different systems, arranged side by side in the circumferential direction of the stator core, are defined as a first end excitation winding and a second end excitation winding, respectively, the first end excitation winding and the second end excitation winding are supplied with excitation signals which generate magnetic fluxes in the same (not opposite) radial directions of the stator core.

10 Claims, 22 Drawing Sheets

(51) Int. Cl.
 *H02K 3/28* (2006.01)
 *H02K 11/33* (2016.01)
(58) Field of Classification Search
 USPC .................................................. 310/216.008
 See application file for complete search history.

(56) References Cited

U.S. PATENT DOCUMENTS

| | | | |
|---|---|---|---|
| 9,013,132 B2 * | 4/2015 | Nakazato | G01D 5/2073 |
| | | | 318/605 |
| 2012/0262158 A1 | 10/2012 | Matsuura et al. | |

FOREIGN PATENT DOCUMENTS

| | | |
|---|---|---|
| JP | 2009-222436 A | 10/2009 |
| JP | 2010-12819 A | 1/2010 |
| JP | 2012-220406 A | 11/2012 |
| JP | 2015-119523 A | 6/2015 |

OTHER PUBLICATIONS

Notice of Reasons for Refusal dated Mar. 15, 2022 from the Japanese Patent Office in JP Application No. 2021-523144.

* cited by examiner

REDUNDANCY RESOLVER DEVICE AND ELECTRIC POWER STEERING DEVICE

CROSS REFERENCE TO RELATED APPLICATIONS

This application is a National Stage of International Application No. PCT/JP2019/020660 filed May 24, 2019.

TECHNICAL FIELD

This invention relates to a redundancy resolver device in which a stator core is provided with winding groups of a plurality of systems, and an electric power steering device including the redundancy resolver device.

BACKGROUND ART

In a related-art resolver, in order to suppress degradation in angle detection accuracy caused by magnetic interference, two sensor units are stacked in two stages in an axis line direction. Further, one sensor unit has only first output windings wound therearound, and the other sensor unit has only second output windings wound therearound (see, for example, Patent Literatures 1 and 2).

CITATION LIST

Patent Literature

[PTL 1] JP 2009-222435 A
[PTL 2] JP 2009-222436 A

SUMMARY OF INVENTION

Technical Problem

In the related-art resolver as described above, with the two sensor units being stacked in two stages in the axis line direction, a dimension in the axis line direction is increased twice that of a resolver of one system. Further, magnetic interference occurs between adjacent teeth to reduce angle detection accuracy.

This invention has been made to solve the above-mentioned problems, and therefore has an object to obtain a redundancy resolver device capable of suppressing an increase in dimension in an axis line direction of a resolver main body caused by redundancy, and a reduction in angle detection accuracy, and an electric power steering device including the redundancy resolver device.

Solution to Problem

According to one embodiment of this invention, there is provided a redundancy resolver device including: a resolver main body including a stator, and a rotor rotatable with respect to the stator; and a control unit including a plurality of excitation circuits, the stator including a stator core, and winding groups of a plurality of systems provided in the stator core, the stator core including a core back portion, and a plurality of teeth which protrude from the core back portion, the winding groups of different systems being arranged at different positions in a circumferential direction of the stator core, the winding groups of each of the plurality of systems including: an excitation winding group consisting of a plurality of excitation windings, and being connected to corresponding one of the plurality of excitation circuits; a first output winding group consisting of a plurality of first output windings; and a second output winding group consisting of a plurality of second output windings, each of the plurality of teeth having corresponding one of the plurality of excitation windings wound therearound, when two of the plurality of excitation windings belonging to different systems and being arranged side by side in the circumferential direction of the stator core are defined as a first end excitation winding and a second end excitation winding, respectively, the first end excitation winding and the second end excitation winding being applied with excitation signals to generate magnetic fluxes in the same direction of radial directions of the stator core.

Advantageous Effects of Invention

According to this invention, an increase in dimension in the axis line direction of the resolver main body caused by redundancy, and a reduction in angle detection accuracy can be suppressed.

DESCRIPTION OF EMBODIMENTS

Now, embodiments of this invention are described with reference to the drawings.

First Embodiment

Figure 1:
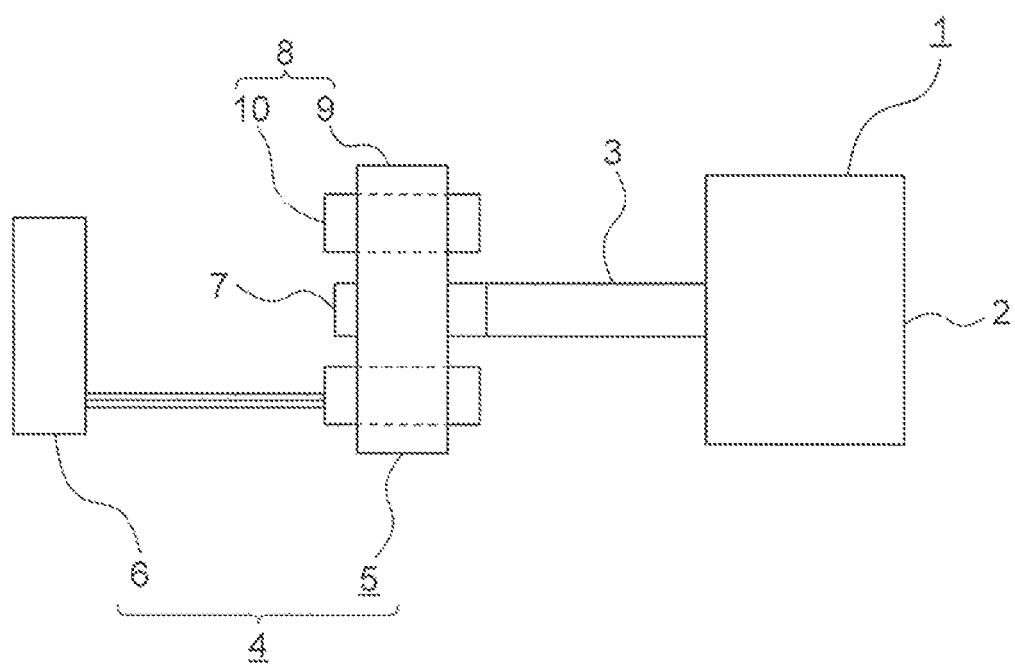
FIG. 1 is a configuration diagram for illustrating a state in which a redundancy resolver device according to a first embodiment of this invention is attached to a rotating electric machine.

FIG. 1 is a configuration diagram for illustrating a state in which a redundancy resolver device according to a first embodiment of this invention is attached to a rotating electric machine. In FIG. 1, a rotating electric machine 1 includes a rotating electric machine main body 2 and a rotating shaft 3. The rotating shaft 3 is rotatable with respect to the rotating electric machine main body 2. An end portion of the rotating shaft 3 protrudes from the rotating electric machine main body 2.

A redundancy resolver device 4 includes a resolver main body 5 and a control unit 6. The resolver main body 5 includes a rotor 7 and a stator 8. The rotor 7 is mechanically connected to the end portion of the rotating shaft 3 to rotate integrally with the rotating shaft 3. Further, the rotor 7 penetrates through the stator 8, and is rotatable with respect to the stator 8.

The stator 8 surrounds the rotor 7. Further, the stator 8 includes a stator core 9 and a winding portion 10. The winding portion 10 is provided in the stator core 9.

The redundancy resolver device 4 is configured to detect a rotation angle of the rotating shaft 3 with the use of a change in permeance in a gap between the rotor 7 and the stator 8. In other words, the redundancy resolver device 4 functions as a rotation angle detection device configured to detect the rotation angle of the rotating shaft 3.

Figure 2:
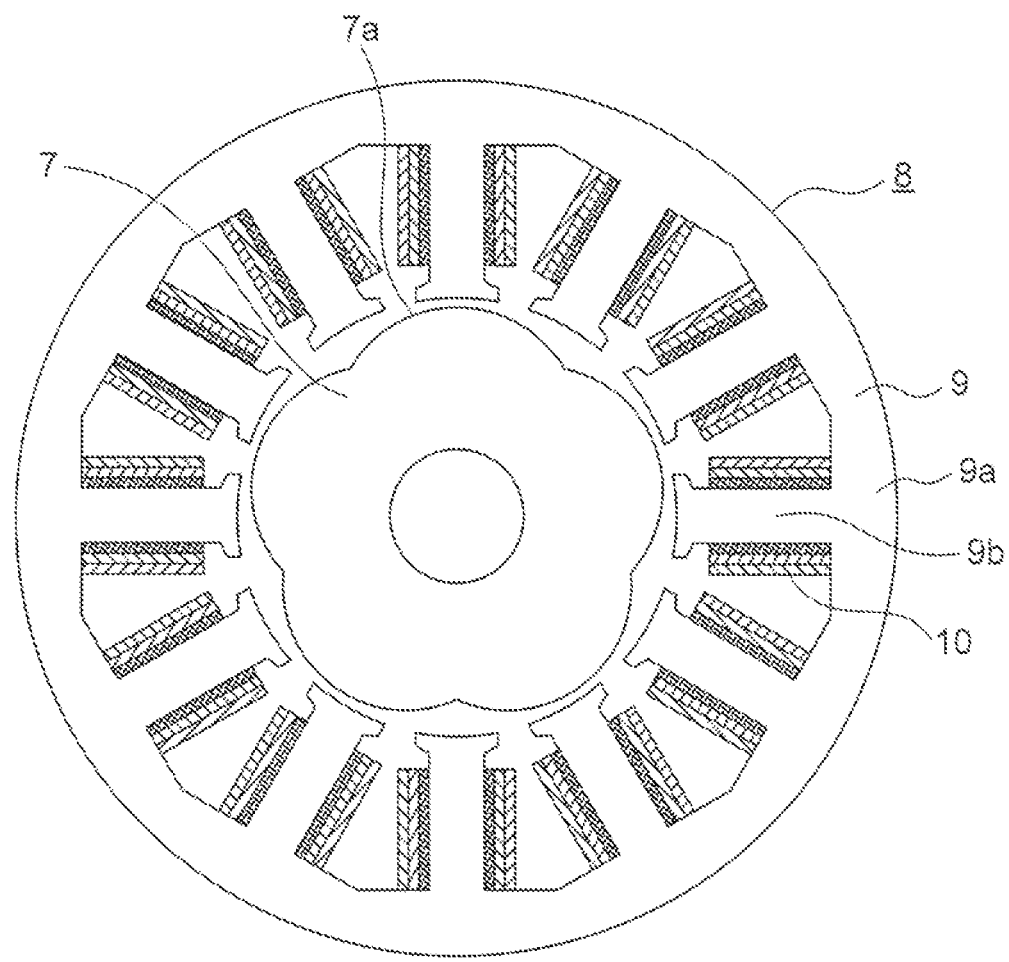
FIG. 2 is a sectional view of a resolver main body of FIG. 1.

FIG. 2 is a sectional view of the resolver main body 5 of FIG. 1, and shows a section perpendicular to an axis line direction of the rotor 7. The axis line direction is a direction parallel to a center of rotation of the rotor 7. Further, radial directions are directions orthogonal to the center of rotation of the rotor 7. Still further, a circumferential direction is a direction in which the rotor 7 rotates about the center of rotation.

When Nx is a natural number, the rotor 7 has Nx salient poles 7a. In other words, the rotor 7 has a shaft angle multiplier of Nx. The number Nx of salient poles 7a in the first embodiment is 5.

The stator core 9 includes a core back portion 9a having an annular shape, and a plurality of teeth 9b protruding inward in the radial directions from the core back portion 9a.

Figure 3:
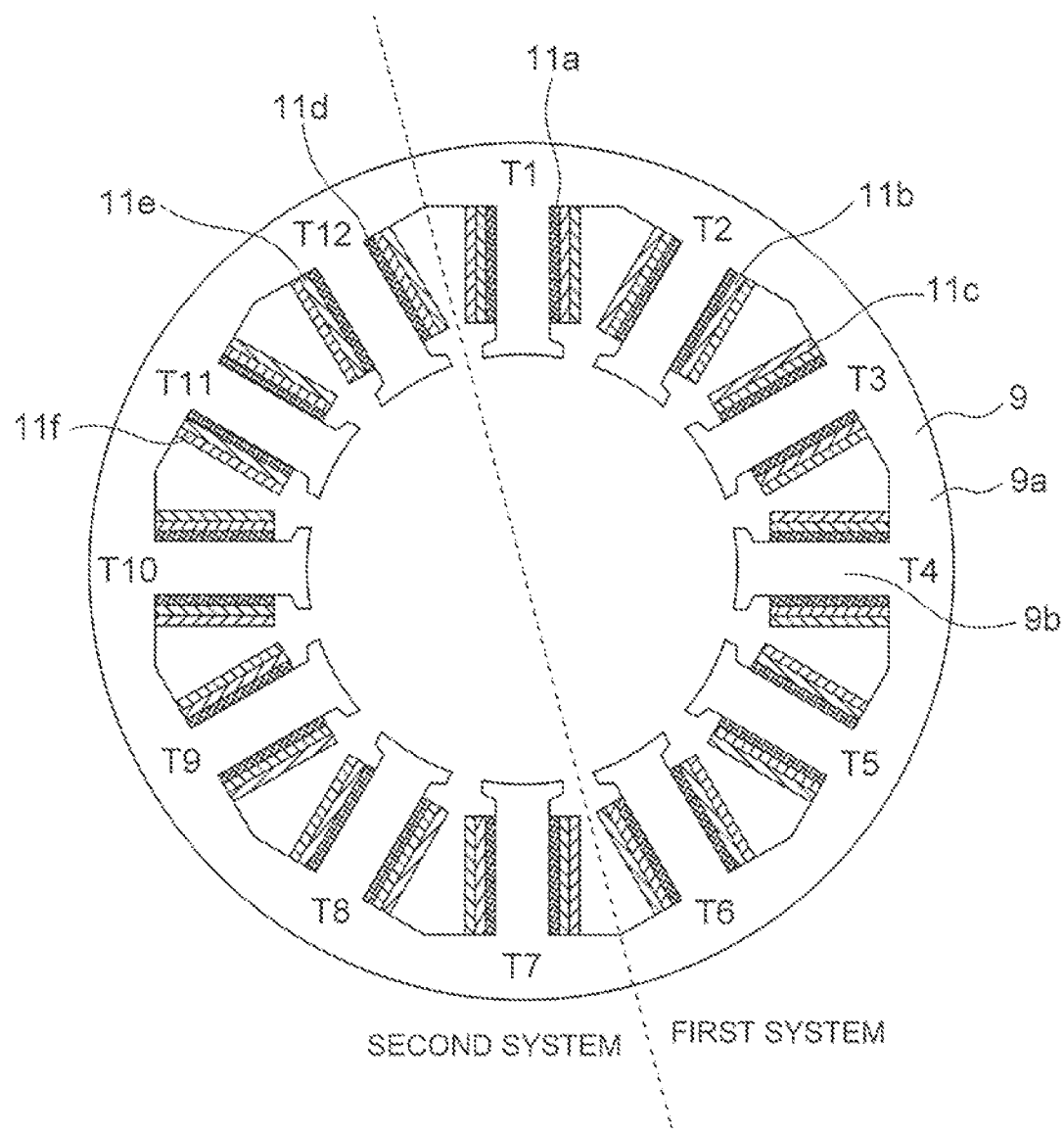
FIG. 3 is a sectional view for illustrating a stator of FIG. 2.

FIG. 3 is a sectional view for illustrating the stator 8 of FIG. 2. The number Ns of teeth 9b in the first embodiment is 12. When the twelve teeth 9b are denoted clockwise as T1 to T12, respectively, the teeth T1 to T6 are teeth of a first system, and the teeth T7 to T12 are teeth of a second system.

Each of the teeth T1 to T6 of the first system has wound therearound a corresponding first excitation winding 11a, a corresponding first output winding 11b, and a corresponding second output winding 11c.

Each of the teeth T7 to T12 of the second system has wound therearound a corresponding second excitation winding 11d, a corresponding third output winding 11e, and a corresponding fourth output winding 11f. The third output winding 11e is a first output winding of the second system. The fourth output winding 11f is a second output winding of the second system.

As described above, each of the teeth 9b has wound therearound an excitation winding of one phase and output windings of two phases. Further, in the first embodiment, around each of the teeth 9b, the excitation winding of the one phase is wound first, and the output windings of the two phases are wound thereon.

One of the first output winding 11b and the second output winding 11c may be wound first. Similarly, one of the third output winding 11e and the fourth output winding 11f may be wound first. Further, teeth 9b around which one of the output windings of the two phases is not wound may be provided.

The stator core 9 is insulated from the windings 11a to 11f by an insulator (not shown). As the insulator, a holder made of a resin, insulating paper, insulation coating, or the like is used.

Figure 4:
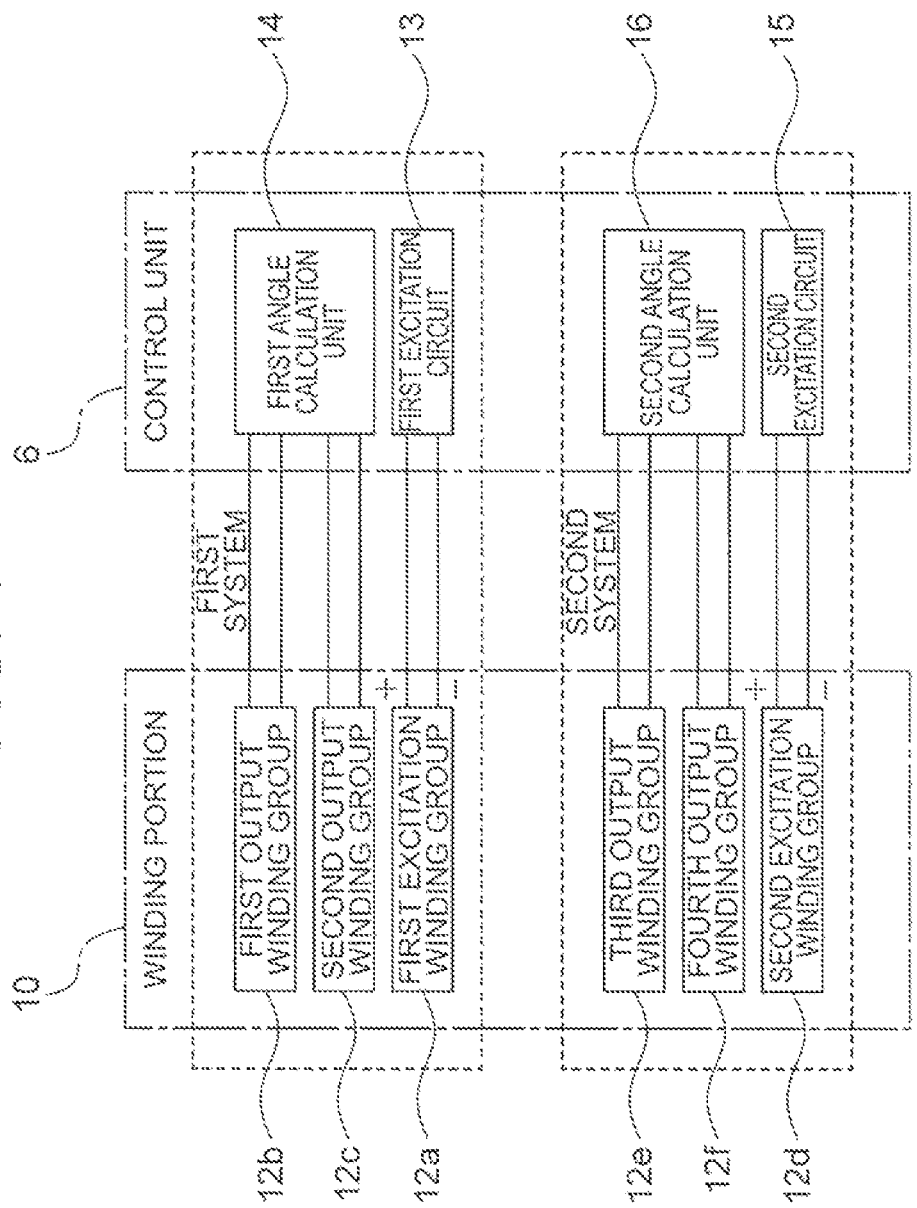
FIG. 4 is a block diagram for illustrating a winding portion and a control unit of FIG. 1.

FIG. 4 is a block diagram for illustrating the winding portion 10 and the control unit 6 of FIG. 1. The winding portion 10 includes winding groups of a plurality of systems. The winding portion 10 in the first embodiment includes winding groups of two systems. In other words, in the first embodiment, the redundancy resolver device 4 of a dual system is illustrated.

The winding groups of the first system include a first excitation winding group 12a, a first output winding group 12b, and a second output winding group 12c. The winding groups of the second system include a second excitation winding group 12d, a third output winding group 12e, and a fourth output winding group 12f. The third output winding group 12e is a first output winding group of the second system. The fourth output winding group 12f is a second output winding group of the second system.

The first excitation winding group 12a consists of six first excitation windings 11a wound around the teeth T1 to T6, respectively. The six first excitation windings 11a are connected in series to each other.

The first output winding group 12b consists of six first output windings 11b wound around the teeth T1 to T6, respectively. The six first output windings 11b are connected in series to each other. The second output winding group 12c consists of six second output windings 11c wound around the teeth T1 to T6, respectively. The six second output windings 11c are connected in series to each other.

The second excitation winding group 12d consists of six second excitation windings 11d wound around the teeth T7 to T12, respectively. The six second excitation windings 11d are connected in series to each other.

The third output winding group 12e consists of six third output windings 11e wound around the teeth T7 to T12, respectively. The six third output windings 11e are connected in series to each other. The fourth output winding group 12f consists of six fourth output windings 11f wound around the teeth T7 to T12, respectively. The six fourth output windings 11f are connected in series to each other.

The winding groups of different systems are arranged different positions in the circumferential direction of the stator core 9. Further, in each system, a tooth to start winding one of the windings therearound may be any tooth.

The control unit 6 includes a first excitation circuit 13, a first angle calculation unit 14, a second excitation circuit 15, and a second angle calculation unit 16. The first excitation circuit 13 and the second excitation circuit 15 are independent of each other.

The first excitation circuit 13 and the first angle calculation unit 14 belong to the first system. The second excitation circuit 15 and the second angle calculation unit 16 belong to the second system.

The first excitation winding group 12a is electrically connected to the first excitation circuit 13 via an excitation terminal (not shown). The first output winding group 12b and the second output winding group 12c are electrically connected to the first angle calculation unit 14 via output terminals (not shown). The excitation terminal and the output terminals are provided in an extended portion (not shown) of the resolver main body 5.

The second excitation winding group 12d is electrically connected to the second excitation circuit 15 via an excitation terminal. The third output winding group 12e and the fourth output winding group 12f are electrically connected to the second angle calculation unit 16 via output terminals.

The first angle calculation unit 14 is configured to calculate a first system detection angle θ1 of the rotor 7 based on output signals from the first output winding group 12b and the second output winding group 12c, and output the first system detection angle θ1. The second angle calculation unit 16 is configured to calculate a second system detection angle θ2 of the rotor 7 based on output signals from the third output winding group 12e and the fourth output winding group 12f, and output the second system detection angle θ2.

Figure 5:
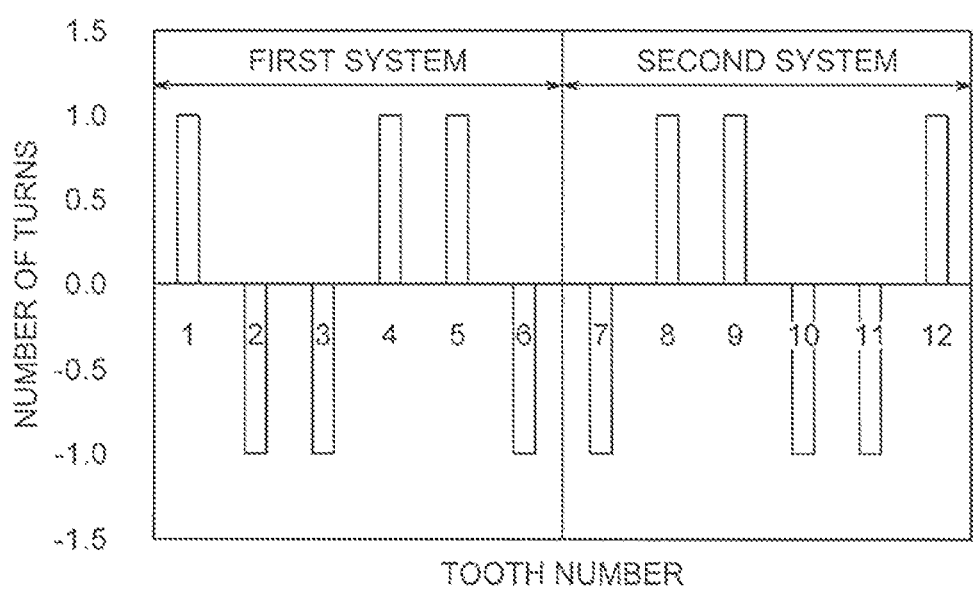
FIG. 5 is an explanatory graph for showing a number-of-turns distribution of first excitation windings and second excitation windings of FIG. 3.

FIG. 5 is an explanatory graph for showing a number-of-turns distribution of the first excitation windings 11a and the second excitation windings 11d of FIG. 3. In FIG. 5, the numbers of turns of the first excitation windings 11a and the second excitation windings 11d are consecutively shown.

Further, "+" and "−" indicate different winding polarities of the windings. In other words, when a winding direction of a wire in one winding is represented by "+", a winding direction opposite thereto is represented by "−". When electrical currents in the same direction flow through the winding of the winding direction "+" and the winding of the winding direction "−", directions of generated electromagnetic fields are opposite in the radial directions of the stator core 9.

An absolute value of the number of turns in the winding direction "+" and an absolute value of the number of turns in the winding direction "−" are the same. In other words, when the number of turns in the winding direction "+" is +X, the number of turns in the winding direction "−" is −X. The numbers of turns of the excitation windings are standardized with amplitudes of the numbers of turns.

In the first excitation windings 11a and the second excitation windings 11d in the first embodiment, every two windings of the winding direction "+" and every two windings of the winding direction "−" are arranged alternately in the circumferential direction of the stator core 9.

Further, a first excitation winding 11a and a second excitation winding 11d that are adjacent to each other in the circumferential direction of the stator core 9 have the same winding direction. In other words, in FIG. 5, a winding direction of the first excitation winding 11a of the tooth T1 and a winding direction of the second excitation winding 11d of the tooth T12 are the same. Similarly, a winding direction of the first excitation winding 11a of the tooth T6 and a winding direction of the second excitation winding 11d of the tooth T7 are the same.

Figure 6:
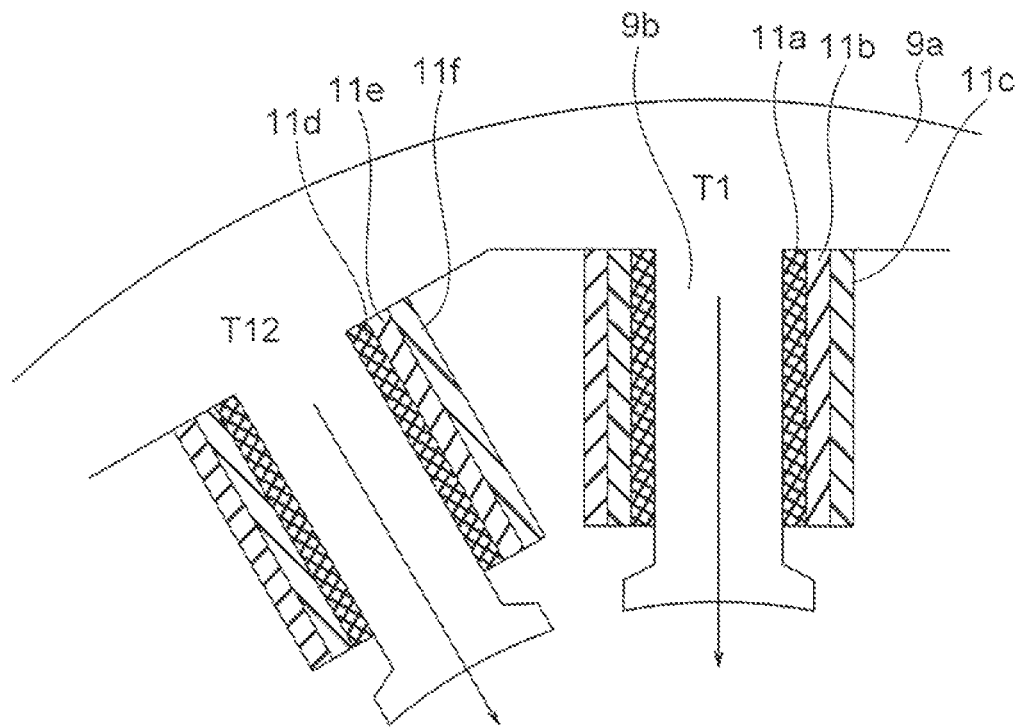
FIG. 6 is an enlarged sectional view for illustrating a main part of FIG. 3.

FIG. 6 is an enlarged sectional view for illustrating a main part of FIG. 3. In FIG. 6, magnetic fluxes generated in the tooth T1 and the tooth T12 and linked with the tooth T1 and the tooth T12 are indicated by the arrows. A direction of the magnetic flux generated in the tooth T1 is the same as a direction of the magnetic flux generated in the tooth T12. Similarly, a direction of a magnetic flux generated in the tooth T6 is the same as a direction of a magnetic flux generated in the tooth T7.

When two excitation windings 11a and 11d belonging to different systems and being arranged side by side in the circumferential direction of the stator core 9 are defined as a first end excitation winding and a second end excitation winding, respectively, the first end excitation winding and the second end excitation winding are applied with excitation signals to generate magnetic fluxes in the same direction of the radial directions of the stator core 9.

Further, the first end excitation winding and the second end excitation winding are wound in the same direction. In addition, a direction in which the first end excitation winding is connected to a corresponding excitation circuit is the same as a direction in which the second end excitation winding is connected to a corresponding excitation circuit.

In the redundancy resolver device described above, the winding groups of different systems are arranged at different positions in the circumferential direction of the stator core 9. Therefore, an increase in dimension in the axis line direction of the resolver main body caused by redundancy can be suppressed.

Further, magnetic fluxes in the same direction of the radial directions of the stator core 9 are generated in the first end excitation winding and the second end excitation winding. Therefore, the effect of magnetic interference between the adjacent teeth can be reduced, and a reduction in angle detection accuracy caused by a deviation between an excitation signal of the first system and an excitation signal of the second system can be suppressed.

Further, the first end excitation winding and the second end excitation winding are wound in the same direction. In addition, the direction in which the first end excitation winding is connected to a corresponding excitation circuit is the same as the direction in which the second end excitation winding is connected to a corresponding excitation circuit. Therefore, the magnetic fluxes in the same direction of the radial directions of the stator core 9 can be generated in the first end excitation winding and the second end excitation winding.

Second Embodiment

Figure 7:
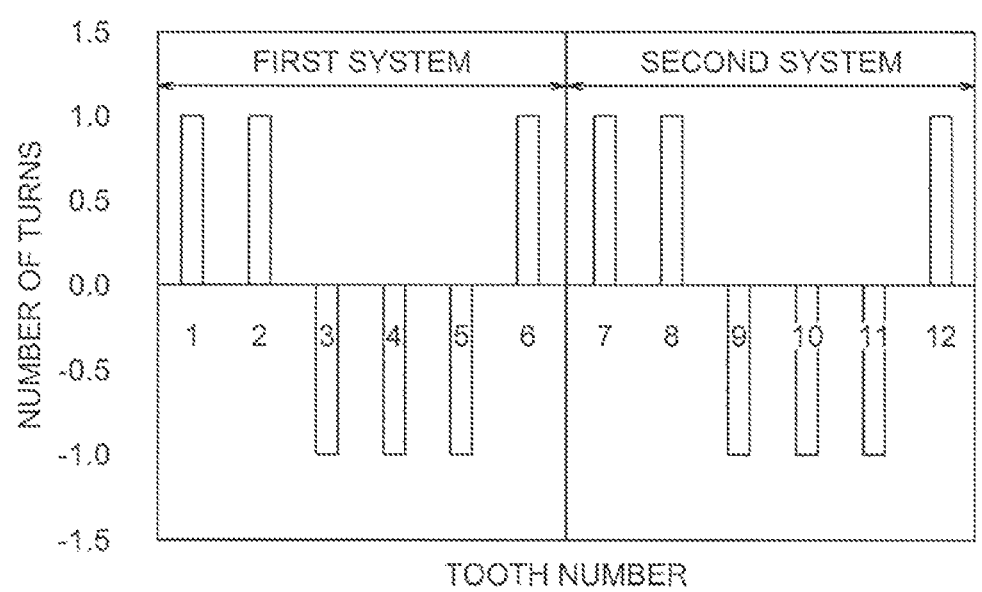
FIG. 7 is an explanatory graph for showing a number-of-turns distribution of s excitation windings and second excitation windings of a redundancy resolver device according to a second embodiment of this invention.

Next, FIG. 7 is an explanatory graph for showing a number-of-turns distribution of first excitation windings 11a and second excitation windings 11d of a redundancy resolver device according to a second embodiment of this invention. In the first excitation windings 11a and the second excitation windings 11d in the second embodiment, every three windings of the winding direction "+" and every three windings of the winding direction "−" are arranged alternately in the circumferential direction of the stator core 9.

A winding direction of the first excitation winding 11a of the tooth T1, a winding direction of the second excitation winding 11d of the tooth T12, a winding direction of the first excitation winding 11a of the tooth T6, and a winding direction of the second excitation winding 11d of the tooth T7 are the same. All other configurations are similar or identical to those of the first embodiment.

Also with the above-mentioned configuration, the increase in dimension in the axis line direction of the resolver main body 5 caused by redundancy, and the reduction in angle detection accuracy can be suppressed.

The number of excitation windings having the same winding direction to be arranged consecutively is not limited to two or three.

Third Embodiment

Figure 8:
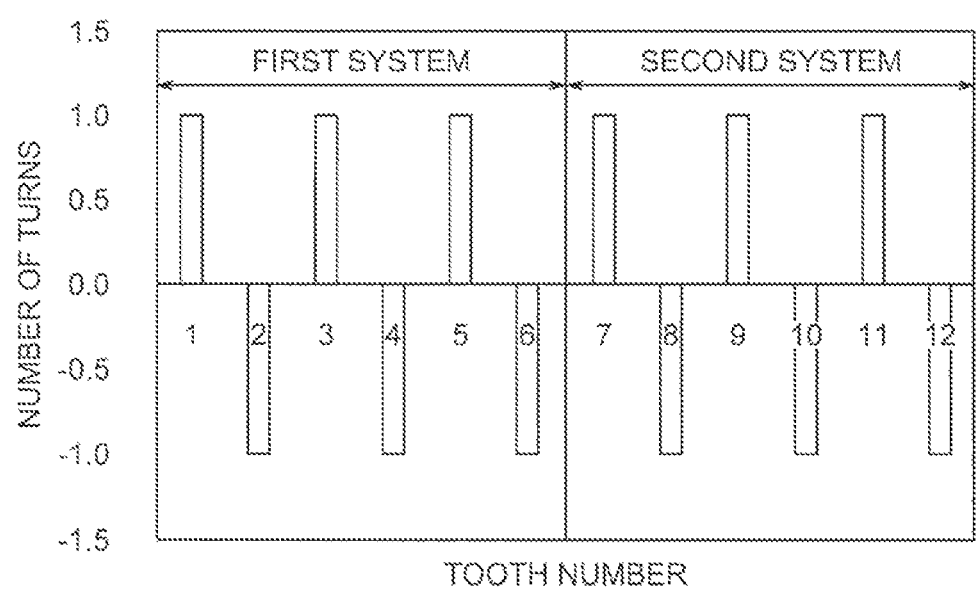
FIG. 8 is an explanatory graph for showing a number-of-turns distribution of first excitation windings and second excitation windings of a redundancy resolver device according to a third embodiment of this invention.

Next, FIG. 8 is an explanatory graph for showing a number-of-turns distribution of first excitation windings 11a and second excitation windings 11d of a redundancy resolver device according to a third embodiment of this invention. In the first excitation windings 11a and the second excitation windings 11d in the third embodiment, every one winding of the winding direction "+" and every one winding of the winding direction "−" are arranged alternately in the circumferential direction of the stator core 9.

Therefore, a winding direction of the first excitation winding 11a of the tooth T1 and a winding direction of the second excitation winding 11d of the tooth T12 are opposite. Similarly, a winding direction of the first excitation winding 11a of the tooth T6 and a winding direction of the second excitation winding 11d of the tooth T7 are opposite. In other words, the first end excitation winding and the second end excitation winding are wound in opposite directions.

Figure 9:
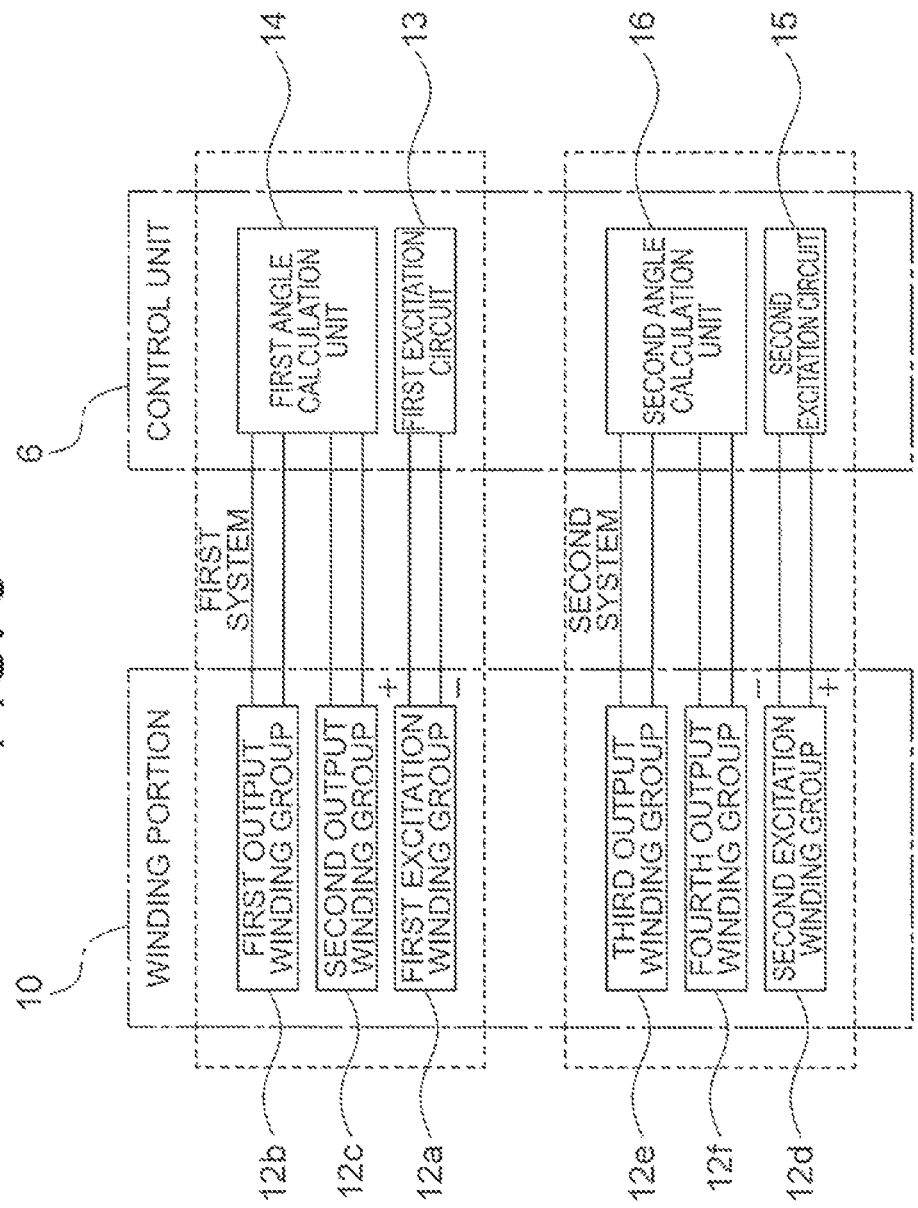
FIG. 9 is a block diagram for illustrating a winding portion and a control unit of the redundancy resolver device according to the third embodiment.

FIG. 9 is a block diagram for illustrating a winding portion 10 and a control unit 6 of the redundancy resolver device according to the third embodiment. A direction in which the first end excitation winding is connected to a corresponding excitation circuit is opposite to a direction in which the second end excitation winding is connected to a corresponding excitation circuit. All other configurations are similar or identical to those of the first embodiment.

In such a redundancy resolver device, the first end excitation winding and the second end excitation winding are wound in the opposite directions. In addition, the direction in which the first end excitation winding is connected to a corresponding excitation circuit is opposite to the direction in which the second end excitation winding is connected to a corresponding excitation circuit.

Therefore, magnetic fluxes in the same direction of the radial directions of the stator core 9 can be generated in the first end excitation winding and the second end excitation winding. Thus, the increase in dimension in the axis line direction of the resolver main body 5 caused by redundancy, and the reduction in angle detection accuracy can be suppressed.

In the third embodiment, every one excitation winding of the winding direction "+" and every one excitation winding of the winding direction "−" are arranged alternately, but two or more excitation windings of the same winding direction can be arranged consecutively.

Figure 10:
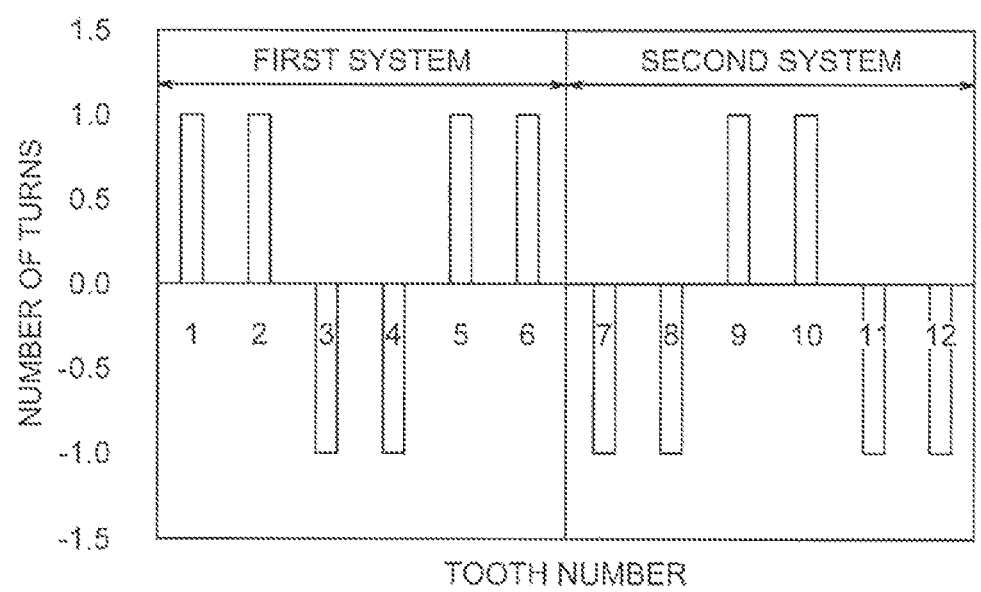
FIG. 10 is an explanatory graph for showing a modification example of the number-of-turns distribution of FIG. 8.

For example, in FIG. 10, every two windings of the winding direction "+" and every two windings of the winding direction "−" are arranged alternately in the circumferential direction of the stator core 9. Further, the first end excitation winding and the second end excitation winding are wound in opposite directions. Also in this case, when a direction in which the first end excitation winding is connected to a corresponding excitation circuit is opposite to a direction in which the second end excitation winding is connected to a corresponding excitation circuit, effects similar to those obtained in the third embodiment can be obtained.

Fourth Embodiment

Figure 11:
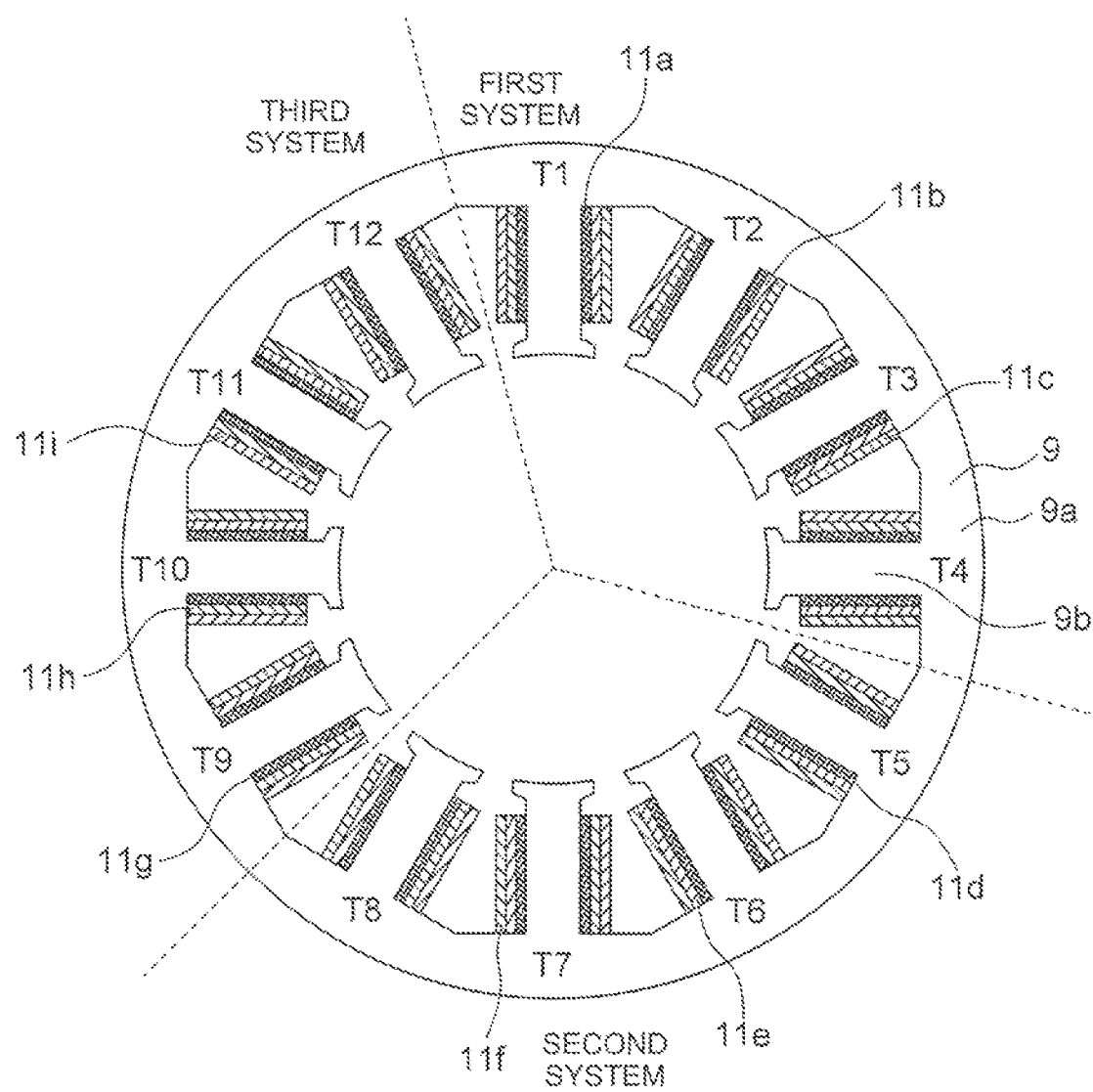
FIG. 11 is a sectional view for illustrating a stator of a redundancy resolver device according to a fourth embodiment of this invention.

Next, FIG. 11 is a sectional view for illustrating a stator of a redundancy resolver device according to a fourth embodiment of this invention. In the fourth embodiment, teeth T1 to T4 are teeth of a first system, teeth T5 to T8 are teeth of a second system, and teeth T9 to T12 are teeth of a third system.

Each of the teeth T1 to T4 of the first system has wound therearound a corresponding first excitation winding 11a, a corresponding first output winding 11b, and a corresponding second output winding 11c.

Each of the teeth T5 to T8 of the second system has wound therearound a corresponding second excitation winding 11d, a corresponding third output winding 11e, and a corresponding fourth output winding 11f. The third output winding 11e is a first output winding of the second system. The fourth output winding 11f is a second output winding of the second system.

Each of the teeth T9 to T12 of the third system has wound therearound a corresponding third excitation winding 11g, a corresponding fifth output winding 11h, and a corresponding sixth output winding 11i. The fifth output winding 11h is a first output winding of the third system. The sixth output winding 11i is a second output winding of the third system.

Figure 12:
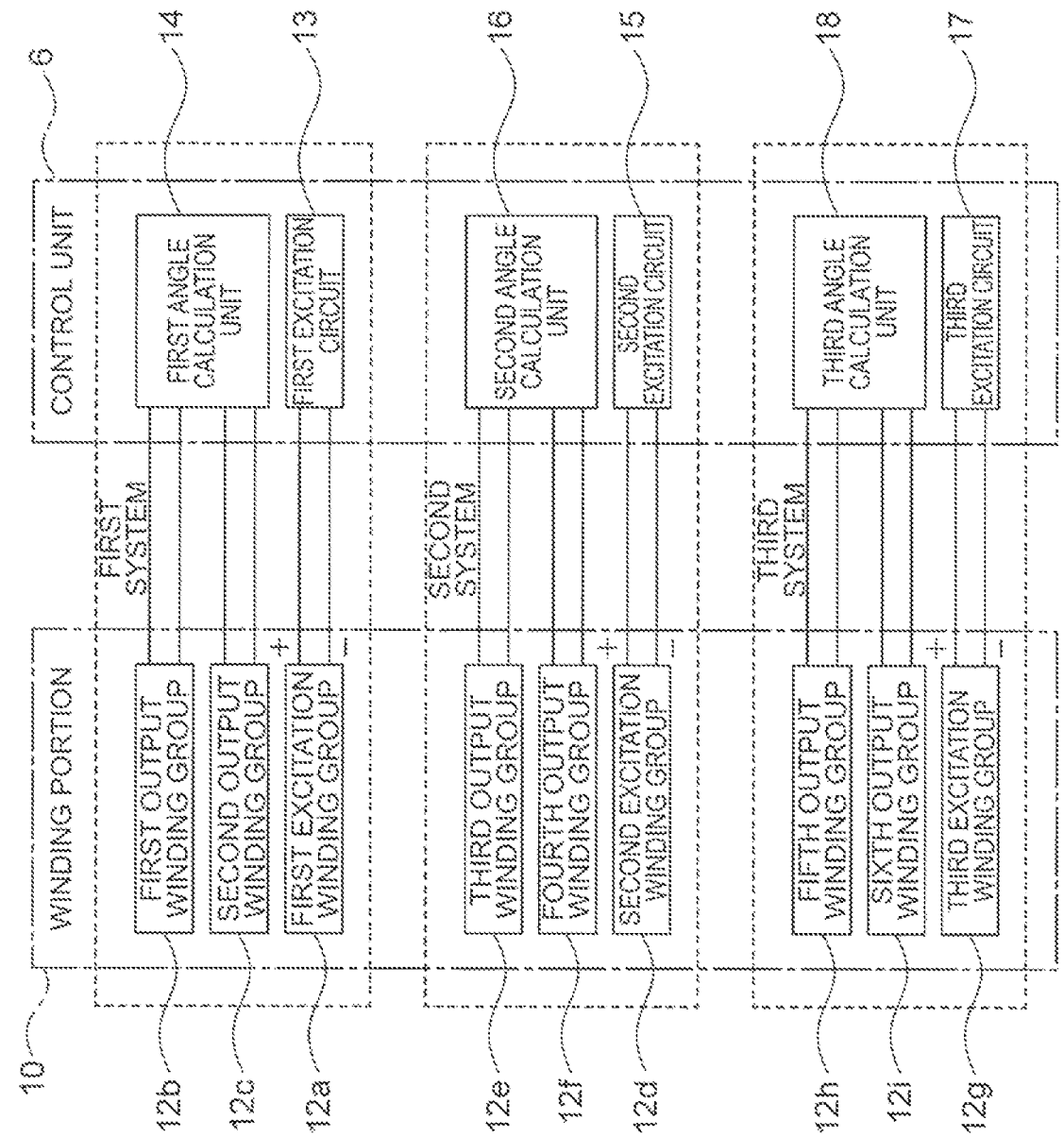
FIG. 12 is a block diagram for illustrating a winding portion and a control unit of the redundancy resolver device according to the fourth embodiment.

FIG. 12 is a block diagram for illustrating a winding portion 10 and a control unit 6 of the redundancy resolver device according to the fourth embodiment. The winding portion 10 in the fourth embodiment includes winding groups of three systems. In other words, in the fourth embodiment, the redundancy resolver device of a triple system is illustrated.

The winding groups of the third system include a third excitation winding group 12g, a fifth output wincing group 12h, and a sixth output winding group 12i. The fifth output winding group 12h is a first output winding group of the third system. The sixth output winding group 12i is a second output winding group of the third system.

The first excitation winding group 12a consists of four first excitation windings 11a wound around the teeth T1 to T4, respectively. The four first excitation windings 11a are connected in series to each other.

The first output winding group 12b consists of four first output windings 11b wound around the teeth T1 to T4, respectively. The four first output windings 11b are connected in series to each other. The second output winding group 12c consists of four second output windings 11c wound around the teeth T1 to T4, respectively. The four second output windings 11c are connected in series to each other.

The second excitation winding group 12d consists of four second excitation windings 11d wound around the teeth T5 to T8, respectively. The four second excitation windings 11d are connected in series to each other.

The third output winding group 12e consists of four third output windings 11e wound around the teeth T5 to T8, respectively. The four third output windings 11e are connected in series to each other. The fourth output winding group 12f consists of four fourth out windings 11f wound around the teeth T5 to T8, respectively. The four fourth output windings 11f are connected in series to each other.

The third excitation winding group 12g consists of four third excitation windings 11g wound around the teeth T9 to T12, respectively. The four third excitation windings 11g are connected in series to each other.

The fifth output winding group 12h consists of four fifth output windings 11h wound around the teeth T9 to T12, respectively. The four fifth output windings 11h are connected in series to each other. The sixth output winding group 12i consists of four sixth output windings 11i wound around the teeth T9 to T12, respectively. The four sixth output windings 11i are connected in series to each other.

The control unit 6 in the fourth embodiment includes a first excitation circuit 13, a first angle calculation unit 14, a second excitation circuit 15, a second angle calculation unit 16, a third excitation circuit 17, and a third angle calculation unit 18. The first excitation circuit 13, the second excitation circuit 15, and the third excitation circuit 17 are independent of each other.

The third excitation circuit 17 and the third angle calculation unit 18 belong to the third system.

The third excitation winding group 12g is electrically connected to the third excitation circuit 17 via an excitation terminal. The fifth output winding group 12h and the sixth output winding group 12i are electrically connected to the third angle calculation unit 18 via output terminals.

The third angle calculation unit 18 is configured to calculate a third system detection angle θ3 of the rotor 7 based on output signals from the fifth output winding group 12h and the sixth output winding group 12i, and output the third system detection angle θ3.

Figure 13:
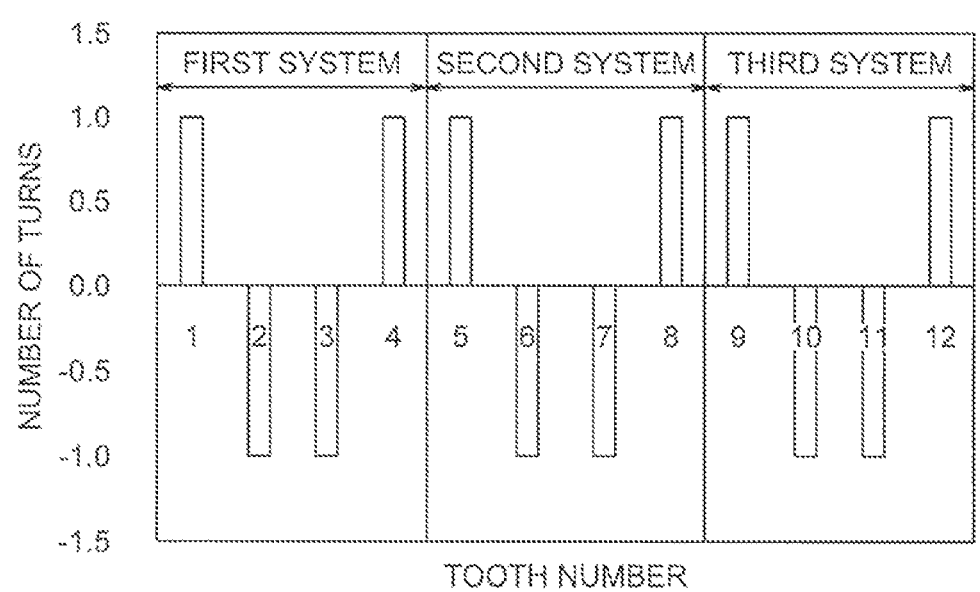
FIG. 13 is an explanatory graph for showing a number-of-turns distribution of first excitation windings, second excitation windings, and third excitation windings of the redundancy resolver device according to the fourth embodiment.

FIG. 13 is an explanatory graph for showing a number-of-turns distribution of the first excitation windings 11a, the second excitation windings 11d, and the third excitation windings 11g in the fourth embodiment. In FIG. 13, the numbers of turns of the first excitation windings 11a, the second excitation windings 11d, and the third excitation windings 11g are consecutively shown.

In the first excitation windings 11a, the second excitation windings 11d, and the third excitation windings 11g in the fourth embodiment, every two windings of the winding direction "+" and every two windings of the winding direction "−" are arranged alternately in the circumferential direction of the stator core 9.

Further, a first excitation winding 11a and a second excitation winding 11d that are adjacent to each other in the circumferential direction of the stator core 9 have the same winding direction. Still further, a second excitation winding 11d and a third excitation winding 11g that are adjacent to each other in the circumferential direction of the stator core 9 have the same winding direction. Yet further, a third excitation winding 11g and a first excitation winding that are adjacent to each other in the circumferential direction of the stator core 9 have the same winding direction.

In other words, in FIG. 13, a winding direction of the first excitation winding 11a of the tooth T1 and a winding direction of the third excitation winding 11g of the tooth T12 are the same. Similarly, a winding direction of the first excitation winding 11a of the tooth T4 and a winding direction of the second excitation winding 11d of the tooth T5 are the same. Similarly, a winding direction of the second excitation winding 11d of the tooth T8 and a winding direction of the third excitation winding 11g of the tooth T9 are the same.

Therefore, a direction of a magnetic flux generated in the tooth T1 is the same as a direction of a magnetic flux generated in the tooth T12. Similarly, a direction of a magnetic flux generated in the tooth T4 is the same as a direction of a magnetic flux generated in the tooth T5. Similarly, a direction of a magnetic flux generated in the tooth T8 is the same as a direction of a magnetic flux generated in the tooth T9. All other configurations are similar or identical to those of the first embodiment.

As described above, also with the redundancy resolver device of the triple system, the increase in dimension in the axis line direction of the resolver main body caused by redundancy, and the reduction in angle detection accuracy can be suppressed.

In the fourth embodiment, a first end excitation winding and a second end excitation winding may be wound in opposite directions. Also in this case, similarly to the third embodiment, it is only required that a direction in which the first end excitation winding is connected to a corresponding excitation circuit be opposite to a direction in which the second end excitation winding is connected to a corresponding excitation circuit.

Fifth Embodiment

Figure 14:
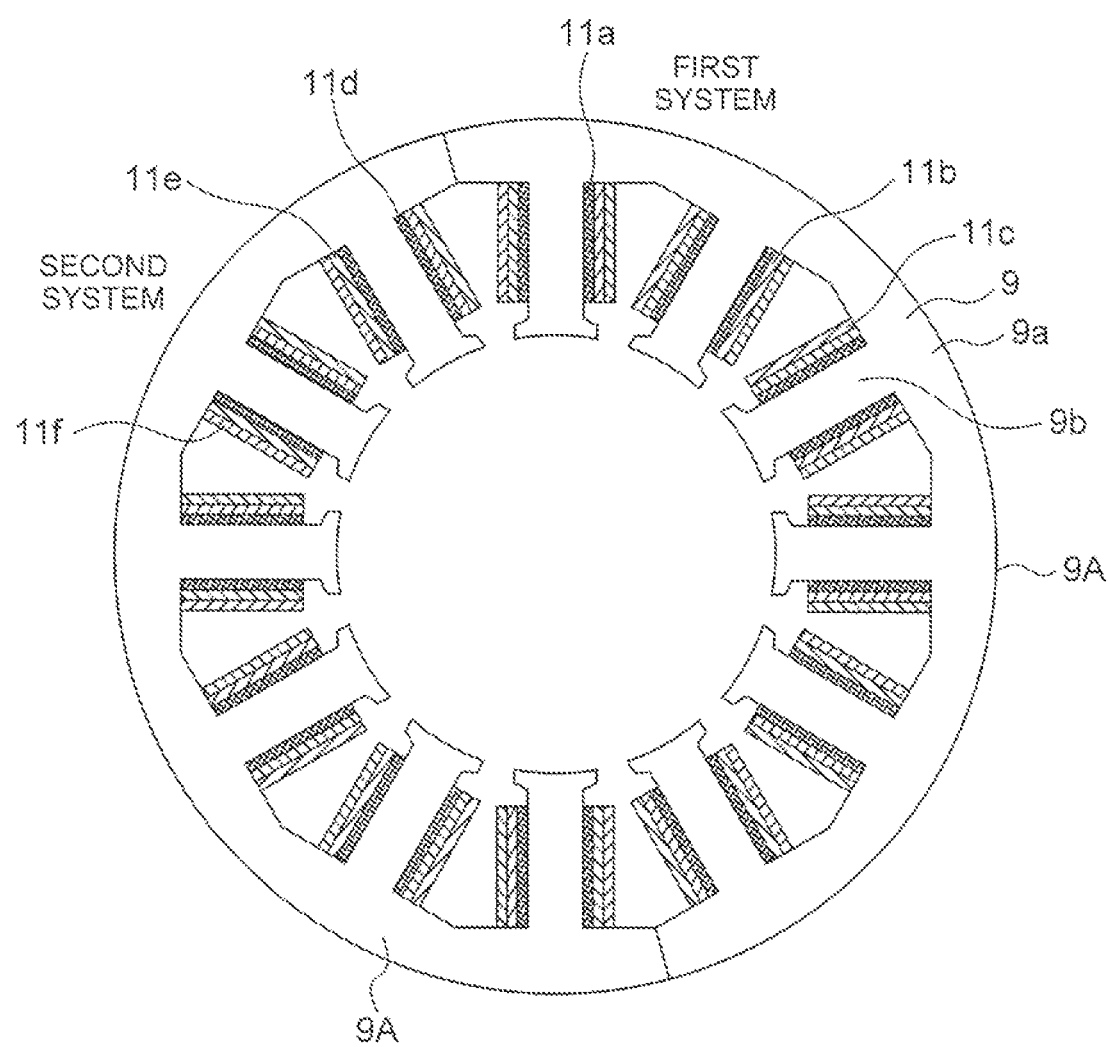
FIG. 14 is a sectional view for illustrating a stator of a redundancy resolver device according to a fifth embodiment of this invention.
Figure 15:
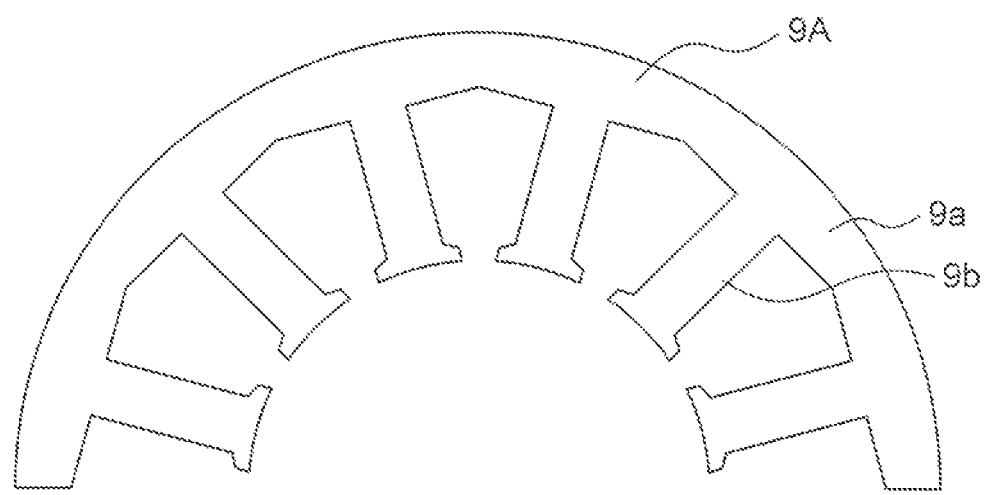
FIG. 15 is a plan view for illustrating a divided core of FIG. 14.

Next, FIG. 14 is a sectional view for illustrating a stator of a redundancy resolver device according to a fifth embodiment of this invention. In the fifth embodiment, a stator core 9 is divided into two in the circumferential direction. In other words, the stator core 9 is formed by combining two arc-shaped divided cores 9A. FIG. 15 is a plan view for illustrating a divided core 9A of FIG. 14. All other configurations are similar or identical to those in one of the first to fourth embodiments.

With the above-mentioned configuration, by winding windings around teeth 9b before combining the two divided cores 9A, winding operation becomes easier, and manufacturability can be increased.

Sixth Embodiment

Figure 16:
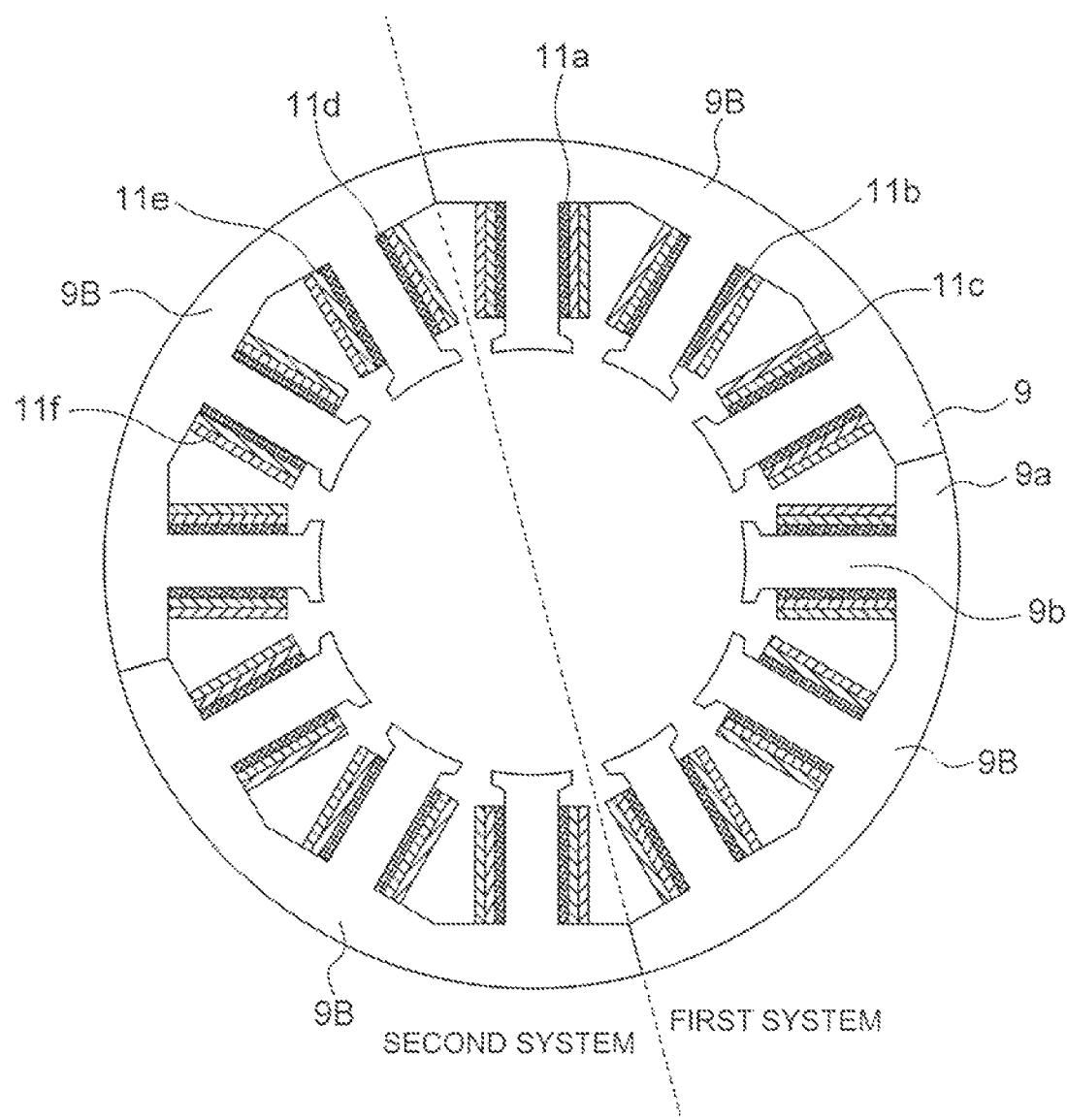
FIG. 16 is a sectional view for illustrating a stator of a redundancy resolver device according to a sixth embodiment of this invention.
Figure 17:
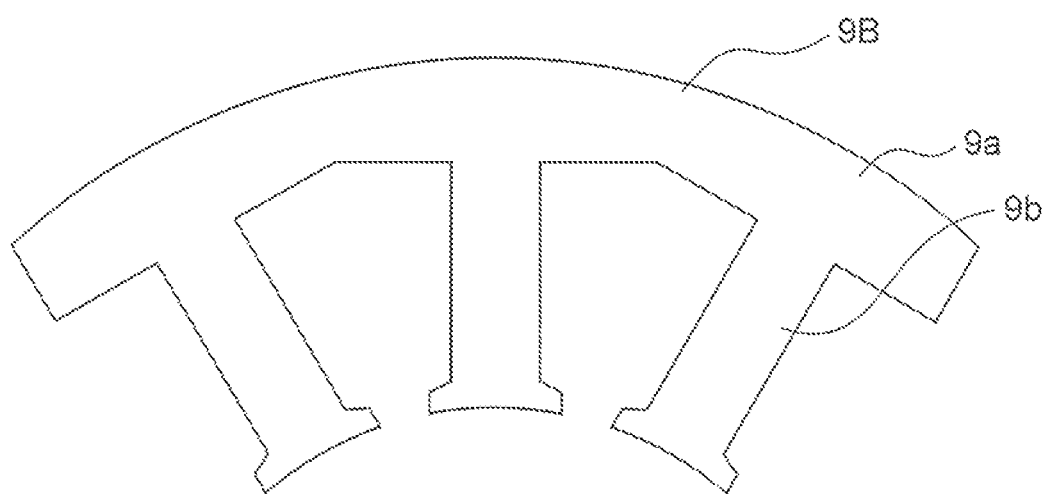
FIG. 17 is a plan view for illustrating a divided core of FIG. 16.

Next, FIG. 16 is a sectional view for illustrating a stator of a redundancy resolver device according to a sixth embodiment of this invention. In the sixth embodiment, a stator core 9 is divided into four in the circumferential direction. In other words, the stator core 9 is formed by combining four arc-shaped divided cores 9B. FIG. 17 is a plan view for illustrating a divided core 9B of FIG. 16. All other configurations are similar or identical to those in one of the first to fourth embodiments.

With the above-mentioned configuration, by winding windings around teeth 9b before combining the four divided cores 9B, winding operation becomes easier, and manufacturability can be increased.

Figure 18:
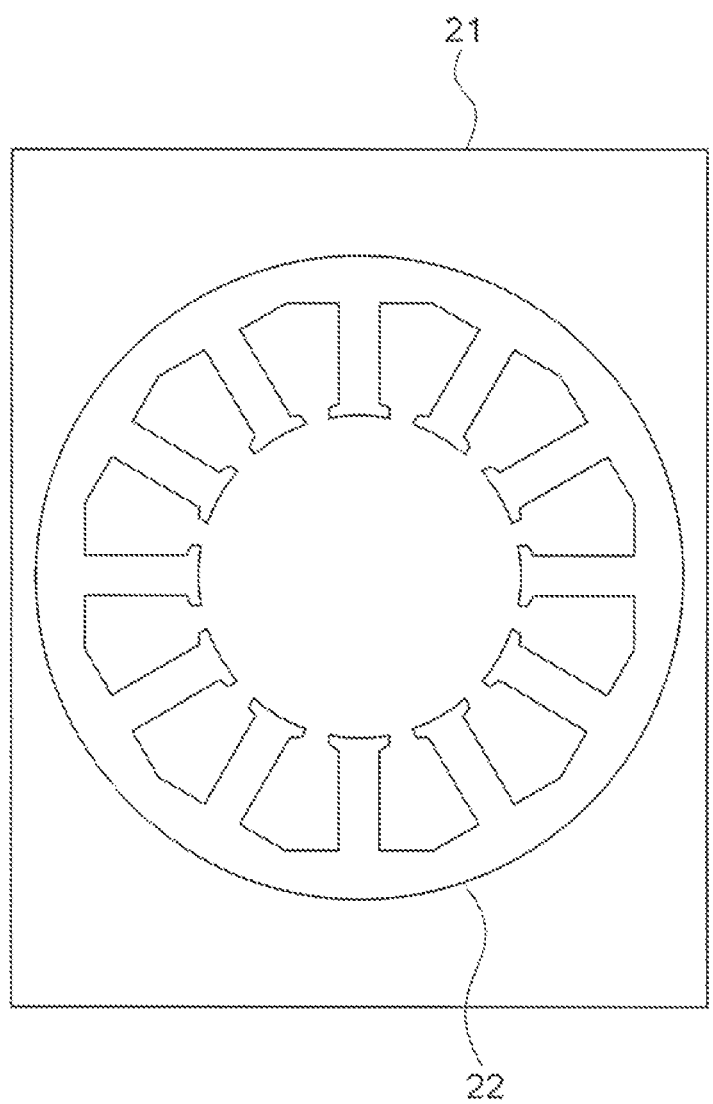
FIG. 18 is an explanatory view for illustrating a method of die-cutting a core piece forming a stator core in the first embodiment to the fourth embodiment from a core sheet.

Here, the stator core 9 as described in the first to sixth embodiments is formed by laminating a plurality of core pieces made of an electromagnetic steel sheet in an axial direction. Therefore, in the stator core 9 in the first to fourth embodiments, as illustrated in FIG. 18, a core piece 22 having an annular shape, which is die-cut from a core sheet 21, is used.

Figure 19:
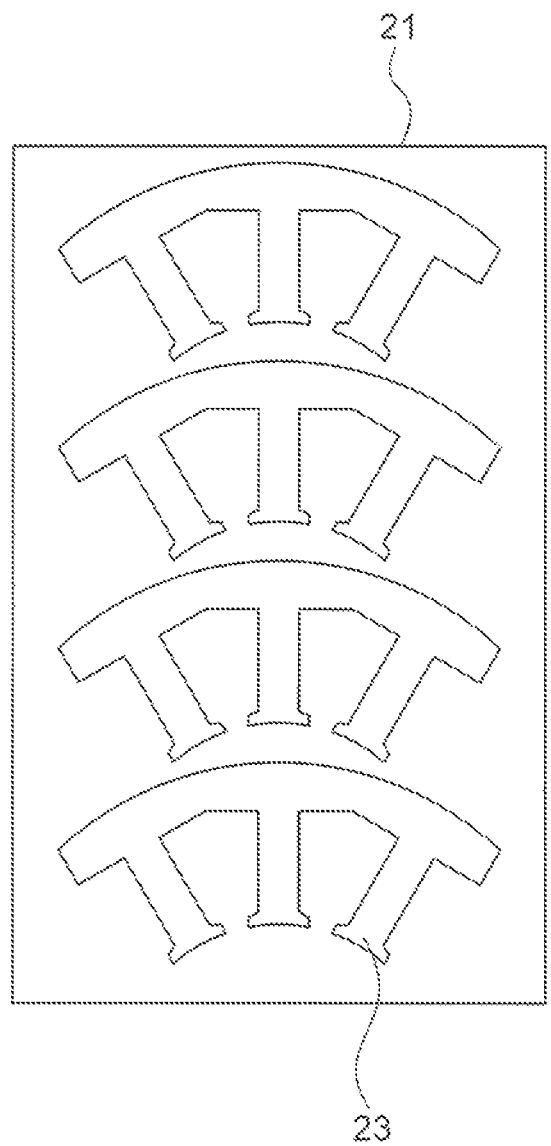
FIG. 19 is an explanatory view for illustrating a method of die-cutting core pieces forming the divided cores in the sixth embodiment from a core sheet.

Meanwhile, in the stator core 9 in the sixth embodiment, as illustrated in FIG. 19, a core piece 23 having an arc shape, which is die-cut from the core sheet 21, is used.

The size of each of the core pieces 23 in the sixth embodiment is smaller than the size of the core piece 22 in the first to fourth embodiments. Therefore, in the sixth embodiment, as compared to the first to fourth embodiments, a narrower roll material can be used as the core sheet 21, and yields can be increased.

Further, in the sixth embodiment, the effect of magnetic anisotropy of the electromagnetic steel sheet forming the stator core 9 can be reduced, and angle detection accuracy can be increased.

The division number in the circumferential direction of the stator core 9 is not limited to two or four, and may be three, or equal to or more than five, for example.

Seventh Embodiment

Figure 20:
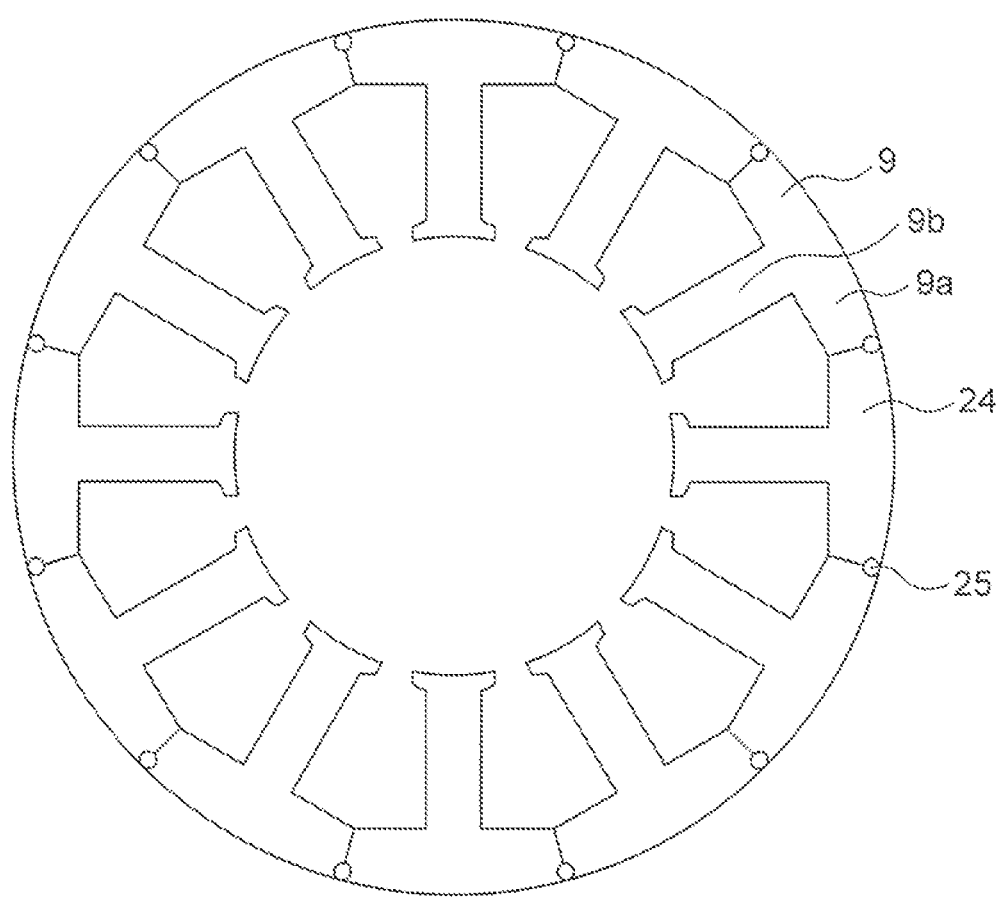
FIG. 20 is a sectional view for illustrating a stator core of a redundancy resolver device according to a seventh embodiment of this invention.

Next, FIG. 20 is a sectional view for illustrating a stator core 9 of a redundancy resolver device according to a seventh embodiment of this invention. The stator core 9 in the seventh embodiment consists of the same number of core blocks 24 as the number of teeth 9b.

Figure 21:
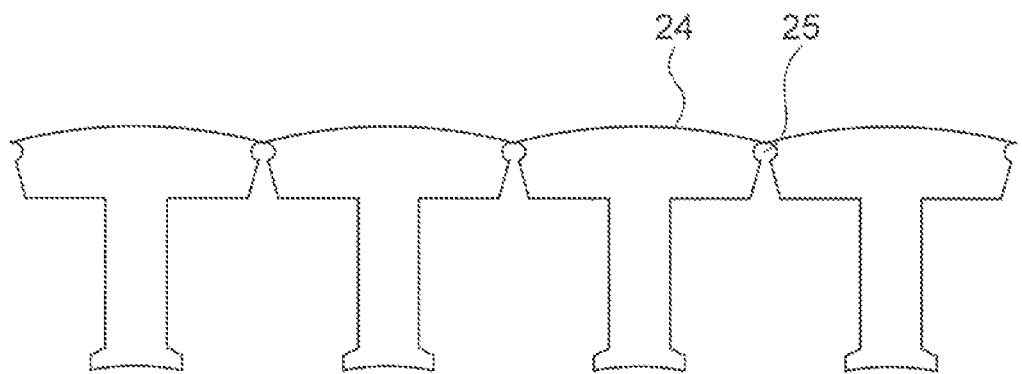
FIG. 21 is a sectional view for illustrating a state in which the stator core of FIG. 20 is developed in straight line.

Each pair of adjacent core blocks 24 are rotatably connected at a connecting portion 25. As a result, the stator core 9 is transformable between a state in which the core blocks 24 are arrayed in an annular shape as illustrated in FIG. 20, and a state in which the core blocks 24 are developed in straight line as illustrated in FIG. 21. All other configurations are similar or identical to those in one of the first to fourth embodiments.

In this configuration, when the stator core 9 is developed in straight line, a gap between each pair of adjacent teeth 9b is increased. When winding operation of the windings is performed under this state, the winding operation becomes easier, and manufacturability can be increased.

A core piece forming a rotor core may be die-cut from the same electromagnetic steel sheet as that of the core pieces forming the stator core.

Further, in the above-mentioned examples, the redundancy resolver devices of the dual system and the triple system have been described, but a quadruple or more system may be adopted.

Still further, the above-mentioned examples, the number of slots is 12, and the shaft angle multiplier is 5. However, this invention is not limited thereto, and similar effects can be obtained even with other configurations.

Yet further, in the above-mentioned examples, the excitation winding of the one phase and the output windings of the two phases are arrayed and wound in the circumferential direction, but this invention is not thereto. Similar effects may be obtained even when the excitation winding of the one phase and the output windings of the two phases are arrayed in the radial directions, or when the order in which the excitation winding of the one phase and the output windings of the two phases are wound around each tooth is changed, for example.

Yet further, the redundancy resolver device in each of the first to seventh embodiments may be applied to an electric power steering device.

Figure 22:
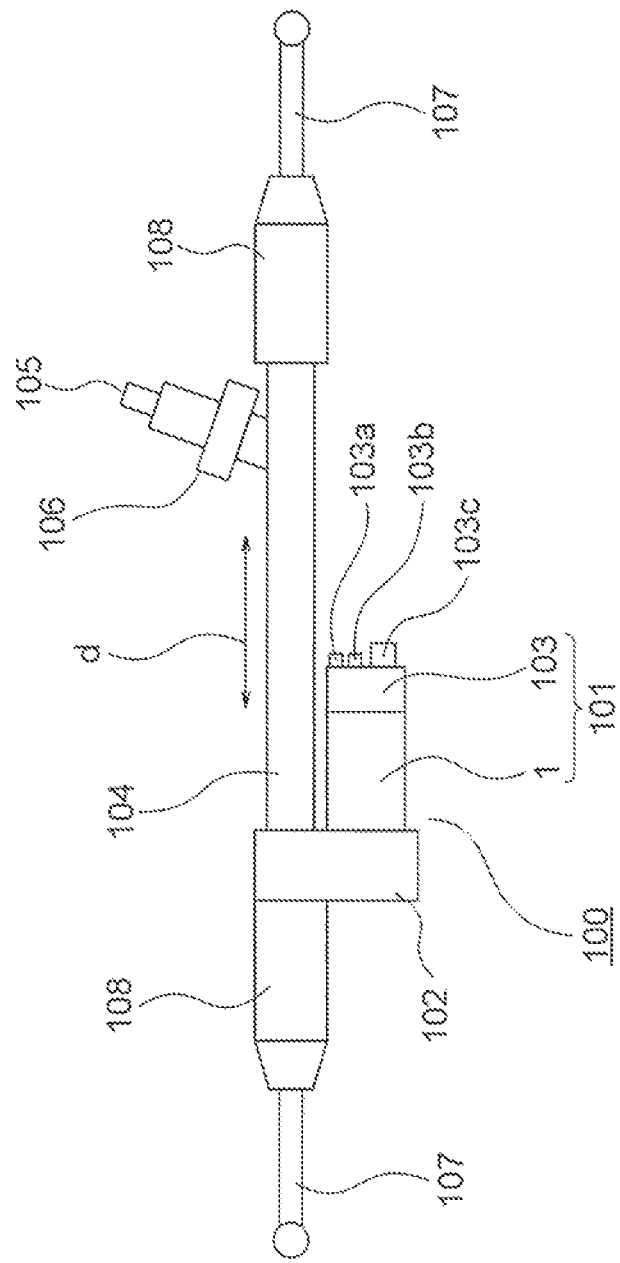
FIG. 22 is a side view for illustrating an example of an electric power steering device to which a redundancy resolver device of this invention is applied.

FIG. 22 is a side view for illustrating an example of an electric power steering device to which the redundancy resolver device of this invention is applied. An electric power steering device 100 includes an electric drive device 101 and a gearbox portion 102.

The electric drive device 101 includes the rotating electric machine 1, an electronic control unit (ECU) 103, and the redundancy resolver device 4 described in one of the first to seventh embodiments. The rotating electric machine 1 in the electric power steering device 100 is an electric motor. Though not shown in FIG. 22, the redundancy resolver device 4 is attached to the rotating shaft 3 of the rotating electric machine 1.

The ECU 103 includes a first connector 103a, a second connector 103b, and a power supply connector 103c. Power is supplied from a battery or an alternator to the ECU 103 via the power supply connector 103c.

The gearbox portion 102 is attached to a housing 104. The gearbox portion 102 includes a belt (not shown) and a ball screw (not shown). The housing 104 includes a rack shaft (not shown).

The gearbox portion 102 is configured to decelerate rotation of the rotating electric machine 1, and transmit the decelerated rotation to the rack shaft. The rotating electric machine 1 is arranged parallel to the rack shaft.

When a driver steers a steering wheel (not shown), torque is transmitted to an input shaft 105 through a steering shaft (not shown). The torque transmitted to the input shaft 105 is detected by a torque sensor 106.

The torque detected by the torque sensor 106 is converted to an electric signal to be input to the first connector 103a through a cable (not shown). Meanwhile, vehicle information including vehicle speed information is converted to an electric signal to be input to the second connector 103b.

The ECU 103 is configured to calculate required assist torque based on the signal from the torque sensor 106 and the vehicle information, and supply an electric current corresponding to the assist torque to the rotating electric machine 1 via an inverter.

Torque generated in the rotating electric machine 1 is input, as thrust for moving the rack shaft in a direction of an arrow d of FIG. 22, to the rack shaft via the gearbox portion 102. As a result, a pair of tie rods 107 are moved to steer a pair of tires (not shown) so that the vehicle can be turned.

As a result, the driver is assisted by the torque or the rotating electric machine 1, and can turn the vehicle with a small steering effort. At both ends of the housing 104, a pair of rack boots 108 are provided. The pair of rack boots 108 prevent foreign matters from entering the housing 104.

REFERENCE SIGNS LIST 4 redundancy resolver device, 5 resolver main body, 6 control unit, 7 rotor, 8 stator, 9 stator core, 9a core back portion, 9b tooth, 9A, 9B divided core, 11a first excitation winding, 11b first output winding, 11c second output winding, 11d second excitation winding, 11e third output winding (first output winding of second system), 11f fourth output winding (second output winding of second system), 11g third excitation winding, 11h fifth output winding (first output winding of third system), 11i sixth output winding (second output winding of third system), 12a first excitation winding group, 12b first output winding group, 12c second output winding group, 12d second excitation winding group, 12e third output winding group (first output winding group of second system), 12f fourth output winding group (second output winding group of second system), 12g third excitation winding group, 12h fifth output winding group (first output winding group of third system), 12i sixth output winding group (second output winding group of third system), 13 first excitation circuit, 15 second excitation circuit, 17 third excitation circuit, 24 core block, 100 electric power steering device

The invention claimed is:

1. A redundancy resolver device, comprising:
a resolver main body including a stator, and a rotor rotatable with respect to the stator; and
a controller including a plurality of excitation circuits,
the stator including a stator core, and winding groups of a plurality of systems provided in the stator core, the stator core including a core back portion, and a plurality of teeth which protrude from the core back portion, the winding groups of different systems being arranged at different positions in a circumferential direction of the stator core, the winding groups of each of the plurality of systems including:

an excitation winding group consisting of a plurality of excitation windings, and being connected to a corresponding one of the plurality of excitation circuits;

a first output winding group consisting of a plurality of first output windings; and a second output winding group consisting of a plurality of second output windings, each of the plurality of teeth having a corresponding one of the plurality of excitation windings wound therearound, and where two of the plurality of excitation windings belonging to different systems and being arranged side by side in the circumferential direction of the stator core are defined as a first end excitation winding and a second end excitation winding, respectively, the first end excitation winding and the second end excitation winding are supplied with excitation signals to generate magnetic fluxes in the same radial directions of the stator core.

2. The redundancy resolver device according to claim 1, wherein the first end excitation winding and the second end excitation winding are wound in the same direction, and wherein the first end excitation winding is connected to its corresponding one of the plurality of excitation circuits in the same direction as a direction in which the second end excitation winding is connected to its corresponding one of the plurality of excitation circuits.

3. The redundancy resolver device according to claim 2, wherein the stator core is formed by combining a plurality of arc-shaped divided cores.

4. The redundancy resolver device according to claim 2, wherein the stator core consists of the same number of core blocks as the number of the plurality of teeth, and is transformable between a state in which the core blocks are arrayed in an annular shape, and a state in which the core blocks are developed in a straight line.

5. The redundancy resolver device according to claim 1, wherein the first end excitation winding and the second end excitation winding are wound in opposite directions, and wherein the first end excitation winding is connected to its corresponding one of the plurality of excitation circuits in an opposite direction to a direction in which the second end excitation winding is connected to its corresponding one of the plurality of excitation circuits.

6. The redundancy resolver device according to claim 5, wherein the stator core is formed by combining a plurality of arc-shaped divided cores.

7. The redundancy resolver device according to claim 5, wherein the stator core consists of the same number of core blocks as the number of the plurality of teeth, and is transformable between a state in which the core blocks are arrayed in an annular shape, and a state in which the core blocks are developed in a straight line.

8. The redundancy resolver device according to claim 1, wherein the stator core is formed by combining a plurality of arc-shaped divided cores.

9. The redundancy resolver device according to claim 1, wherein the stator core consists of the same number of core blocks as the number of the plurality of teeth, and is transformable between a state in which the core blocks are arrayed in an annular shape, and a state in which the core blocks are developed in a straight line.

10. An electric power steering device, comprising the redundancy resolver device of claim 1.

* * * * *